United States Patent Office 3,534,124
Patented Oct. 13, 1970

3,534,124
COMPOSITIONS OF POLYFLUOROKETONE/ EPOXIDE COPOLYMERS AND AN ORGANIC ADDITIVE
Edward George Howard, Jr., Hockessin, Del., assignor to E. I. du Pont de Nemours and Company, Wilmington, Del., a corporation of Delaware
No Drawing. Continuation-in-part of application Ser. No. 519,187, Jan. 7, 1966. This application Sept. 19, 1969, Ser. No. 859,548
Int. Cl. C08g 51/58, 51/60
U.S. Cl. 260—901
10 Claims

ABSTRACT OF THE DISCLOSURE

Copolymers of polyfluoroketones and epoxy compounds, useful as water repellant coatings can be improved in thermal stability by additives consisting of basic, organic hydrogen bonding compounds.

RELATED APPLICATIONS

This application is a continuation-in-part of application Ser. No. 519,187 filed Jan. 7, 1966, now U.S. Pat. No. 3,485,792.

FIELD OF THE INVENTION

This invention concerns polymeric compositions and a process for their preparation. More specifically, the invention is directed to heat-stabilized compostions of a polyfluoroketone/epoxide copolymer and a thermal stabilizing additive.

BACKGROUND OF THE INVENTION

Copolymers prepared from polyfluoroketone and epoxide monomers have been described in U.S. Pat. 3,316,216 issued Apr. 25, 1967 to F. S. Fawcett and E. G. Howard, Jr. and are useful as coatings to impart water-insensitivity to substrates, or as treating agents for cloth or paper to impart water-repellency thereto. However, these copolymers are subject to thermal instabilty thus limiting their application.

SUMMARY OF THE INVENTION

The compositions of the present invention can be defined as comprising:
(A) An addition polymer of
(i) at least one polyfluoroketone of the group consisting of

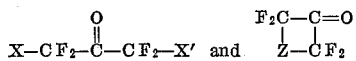

wherein X and X' are selected from the class consisting of hydrogen, fluorine, chlorine, bromine and polyfluoroalkyl of up to 18 carbons and Z is polyfluoroalkylene of 1-3 carbons; and
(ii) at least one epoxide of the group consisting of:

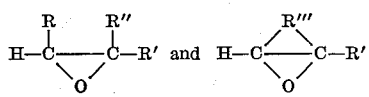

wherein X and X' are selected from the glass consisting sisting of hydrogen, cyano, carboxy, alkyl, alkenyl, alkoxyalkyl, haloalkyl in which the halogen is of atomic number 9–35, hydroxyalkyl, alkoxycarbonyl, carbocyclooxyalkylenyl, carbacyl, carboxyalkylenyl and alkoxycarbonylalkylenyl of up to 18 carbons, aryl and aryloxyalkyl of up to 14 carbons, aralkyl of up to 12 carbons, and cycloalkyl of up to 7 carbons, and R''' is alkylene of 2–6 carbons;

(iii) the mole ratio of polyfluoroketone to epoxide being in the range 0.01 to 1:1; and (B) An additive in an amount from 0.1 to 20% by weight and preferably from 0.1 to 5% by weight of said polymer selected from the class consisting of:

(i) hydrocarbon esters of up to 30 carbon atoms per ester group;
(ii) hydrocarbon ethers of up to 30 carbon atoms;
(iii) hydrocarbon substituted amines of up to 36 carbon atoms.
(iv) hydrocarbon amides of up to 30 carbon atoms; and,
(v) hydrocarbon ketones of up to 35 carbon atoms:

the additive being a basic organic compound capable of shifting the O-D band in the infrared spectrum of $CH_3OD$ by at least 50 cm.$^{-1}$ and having a boiling point of at least 150° C. and preferably of at least 200° C. at atmospheric pressure.

DETAILED DESCRIPTION OF THE INVENTION

The copolymer components of the stabilized composition of this invention are fully described in U.S. Pat. 3,316,216 issued Apr. 25, 1967.

It has now been found that such copolymers are thermally stabilized, without loss of desirable properties, by the addition to the copolymer, of a functionally substituted basic organic compound which is characterized by its ability to shift the O-D infrared absorption band in $CH_3OD$ by at least 50 cm.$^{-1}$ from the normal postion. The shift in the infrared band is a measure of the basicity of the organic additives as discussed by Gordy and Stanford, J. Chem. Phys., 9, 204–14 (1941) and 8, 170–7 (1940) and by G. C. Pimental and A. L. McClellan, "The Hydrogen Bond," W. H. Freeman & Co. (1960), pp. 90–91. The additives with the largest shifts provide the most heat stable compositions of this invention.

The heat stabilized compositions of this invention can be obtained simply by dissolving the thermal stabilizing additive in an inert solvent, adding it to the copolymer (which is preferably in finely divided form), and grinding the ingredients together while the solvent evaporates. Alternatively, both the copolymer and the additive can be dissolved in the inert solvent and the solvent evaporated, or they can be ground together in the absence of a solvent. In all methods, a thermally stable mixture of the copolymer and the additive is obtained.

The additives employed in the compostion of this invention are basic organic compounds which boil above 150° C. at atmospheric pressure and contain functional groups, in which the basicity, as determined by the shift in the infrared spectrum described previously, exceeds 50 cm.$^{-1}$. These compounds include the following classes (representative basicities in cm.$^{-1}$ shifts are in parentheses):

(1) Hydrocarbon esters of up to 30 carbon atoms per ester group, exemplified by triacetin, dibutyl phthalate (63), dioctyl phthalate (56), diphenyl succinate, diphenyl phthalate, polyvinyl acetate, polymethyl methacrylate, phenyl benzoate, di-n-hexyl carbonate, isobutyl carbonate (124), n-amyl propionate, diethyl oxalate (124), phenyl acetate, benzyl benzoate (124), butyl phthalate, and the like.

(2) Hydrocarbon ethers of up to 30 carbon atoms such as diphenyl ether, dinaphthyl ether,

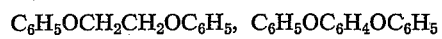

anisole (94), diamyl ether (77), benzyl methyl ether (77), dibenzyl ether (77), phenetole (130), cresyl methyl ether (103), and the like.

(3) Hydrocarbon substituted amines of up to 36 carbon atoms such as aniline (181), diphenylamine, tridodecylamine, octadecylamine, dicyclohexylamine, and the like.

(4) Hydrocarbon amides of up to 30 carbon atoms exemplified by N,N-dimethylformamide, N,N-dimethylacetamide (123), N,N-dimethylcaproamide, N,N-diphenylacetamide, and the like.

(5) Hydrocarbon ketones of up to 35 carbon atoms, such as benzil, acetophenone (101), di-n-heptadecyl ketone, cyclohexanone (70), phenyl isopropyl ketone, acetodurene, benzophenone, 9-anthraphenone, methyl amyl ketone (110), acetonylacetone (103), phenyl propyl ketone (110), and the like.

The term "hydrocarbon" in the foregoing items is defined as including alkyl, cycloalkyl, aryl, alkaryl, aralkyl, alkenyl, and the like. Alkyl, aryl and alkaryl constitute a preferred class, with aryl and alkaryl being most preferred, especially the latter. Of items (1)–(5), the additives in item (1) are preferred.

The amount of additive employed, and which is contained in the resulting compositions, ranges from 0.1 to 20 percent by weight of the copolymer or copolymers. Preferably the amount of additive will be between 0.1 to 5 percent by weight, and most preferably between 0.5 and 2 percent.

EXAMPLES

The following examples are provided solely to illustrate the invention, as the invention is not limited to the specific examples shown.

(A) Hexafluoroacetone/ethylene oxide copolymer is prepared as follows: A Pyrex polymer tube (capacity, 250 ml.) was washed with soap, rinsed with water and soaked with dilute nitric acid. The flame dried tube was charged wtih 22.6 mg. of tetraethylammonium chloride and attached to a vacuum train. The tube was heated with live steam for 5 mintues using a quart Dewar flask as a container while maintaining a vacuum of $10^{-5}$ mm. of mercury. The tube was then cooled with liquid nitrogen and charged with 166 g. (100 ml. at $-78°$ C., 1 mole) of hexafluoroacetone and 44 g. (1 mole) of ethylene oxide. The tube was sealed and tumbled in a water bath for 1 hour at 25° C., 18 hours at 55° C. and finally 8 hours at 60° C. There resulted 208 g. of polymer.

(B) Compositions of this invention, viz., hexafluoroacetone/ethylene oxide copolymer containing the various additives listed in the following Table I were prepared by dissolving the additive in ether, adding it in an agate mortar to the finely divided copolymer, and grinding the ingredients with a pestle while the ether evaporated. The able also shows the heat stability, recorded by weight loss, of the composoitions after various time periods.

TABLE I.—WEIGHT LOSS OF COMPOSITION IN PERCENT AFTER THESE HOURS AT 207° C.

| Example | Additive (percent) | 0.5 hr. | 1.5 hrs. | 2.5 hrs. | 3.5 hrs. | 4.5 hrs. | 5.5 hrs. | 6.5 hrs. |
|---|---|---|---|---|---|---|---|---|
| | None | 14 | 33 | 57 | | | | |
| | Esters: | | | | | | | |
| 1 | Triacetin (5) | 8.5 | 21 | 27 | | | | |
| 2 | Di-n-hexyl carbonate (5) | 10.7 | 17.8 | 26.1 | | | | |
| 3 | $C_6H_5CO_2C_6H_5$ (5) | 4.9 | 10.8 | 19 | | | | |
| 4 | Dioctyl phthalate (5) | 1.8 | 3.5 | 5.4 | 7.9 | 9.8 | 12.1 | 15 |
| 5 | Diphenyl succinate (5) | 1.1 | 1 | 1.9 | | | | |
| 6 | Polymethyl methacrylate (5) | 2.3 | 2.3 | 2.3 | 2.5 | | | |
| 7 | Polyvinyl acetate (5) | 2.3 | 2.4 | 10.5 | | | | |
| 8 | Diphenyl phthalate (5) | 0.8 | 3.5 | 6.3 | 8.5 | 10.8 | 13 | |
| | Ethers: | | | | | | | |
| 9 | $C_6H_5OC_6H_5$ (5) | 4.5 | 8.6 | 16.5 | | | | |
| 10 | $C_6H_5OCH_2CH_2OC_6H_5$ (5) | 3.7 | 4.6 | 5 | 5.4 | 5.5 | | |
| 11 | $m\text{-}C_6H_5OC_6H_4OC_6H_5$ (5) | 1.3 | 3.2 | 4.5 | 5.1 | 5.4 | 6.6 | |
| | Amines: | | | | | | | |
| 12 | Diphenylamine (5) | 6.1 | 5.1 | 5.2 | 5.4 | 5.5 | 5.5 | |
| 13 | Tridodecylamine (5) | 0.9 | 1.2 | 1.4 | 1.6 | 2.1 | 2.0 | 2.1 |
| | Amides: | | | | | | | |
| 14 | $(C_6H_5)_2NCOCH_3$ (5) | 0.7 | 1.7 | 2.3 | 2.8 | 4.3 | 4.7 | |
| | Ketones: | | | | | | | |
| 15 | $C_6H_5COCOC_6H_5$ (5) | 2.4 | 10 | 20 | | | | |

The infrared absorption bands for some of the additives were compared as solutions in dry carbon tetrachloride, which is a hydrogen-free solvent, and as solutions in a hexafluoroacetone/ethylene oxide copolymer. The results are recorded in Table II as follows:

TABLE II

| Additive | Group | $CCl_4$ | Polymer | Remarks |
|---|---|---|---|---|
| Dioctylphthalate | C=O | 5.77μ | 5.75μ | Insolvent, sharp band. In polymer, broad with three shoulders. |
| $(CH_2CO_2C_6H_5)_2$ | C=O | 5.63μ | 5.66μ | Sharp in solvent, two shoulders in polymer. |
| $(C_6H_5)_2NH$ | N—H | 2.88μ | 2.92μ | |

These infrared absorption results indicate that there is an association between the copolymer and the additive.

As Table I shows, the compositions of this invention are surprisingly more stable to heat up to 207° C. Preferred compositions are those containing additives which lose less than 5% by weight after 2.5 hours at 207° C.

Because the additive improves the heat-resistivity of the copolymers without altering the other useful properties of the copolymer, in particular the water-repellency properties, the compositions of this invention find utility in applications similar to that of the untreated polymer. Thus, the compositions of this invention can be sprinkled on paper and the paper then subjected to 3000 lb./sq. in. pressure at 150–215° C. to obtain a water-resistant film or coating over the paper.

The embodiments of the invention in which an exclusive property or privilege is claimed are defined as follows:

1. A composition comprising
 (A) an addition polymer of
  (i) at least one polyfluoroketone of the group consisting of

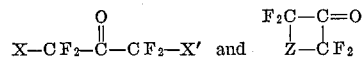

wherein X and X' are selected from the class consisting of hydrogen, fluorine, chlorine, bromine and polyfluoroalkyl of up to 18 carbons and Z is polyfluoroalkylene of 1–3 carbons;
  (ii) at least one epoxide of the group consisting of

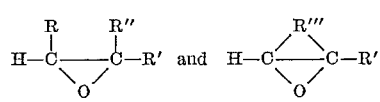

wherein R, R' and R" are selected from the class consisting of hydrogen, cyano, carboxy, alkyl, alkenyl, alkoxyalkyl, haloalkyl in which the halogen is of atomic number 9–35, hydroxyalkyl, alkoxycarbonyl, carbocyclooxyalkylenyl, carbacyl, carboxyalkylenyl and alkoxycarbonylalkylenyl of up to 18 carbons, aryl and aryloxyalkyl of up to 14 carbons, aralkyl of up to 12 carbons, and cycloalkyl of up to 7 carbons, and R''' is alkylene of 2-6 carbons;

(iii) the mole ratio of polyfluoroketone to epoxide being in the range 0.01 to 1:1; and (B) an additive, in an amount of 0.1 to 20% by weight of said polymer selected from the class consisting of (i) hydrocarbon esters of up to 30 carbon atoms per ester group;
(ii) hydrocarbon ethers of up to 30 carbon atoms;
(iii) hydrocarbon substituted amines of up to 36 carbon atoms;
(iv) hydrocarbon substituted amides of up to 30 carbon atoms;
(v) hydrocarbon ketones of up to 35 carbon atoms;

said additive being a basic organic compound capable of shifting the O-D stretching band in the infrared spectrum of $CH_3OD$ by at least 50 cm.$^{-1}$ and having a boiling point of at least 150° C.

2. The composition of claim 1 wherein said additive is a hydrocarbon ester of up to 30 carbon atoms per ester group.

3. The composition of claim 2 wherein said additive is dioctyl phthalate.

4. The composition of claim 2 wherein said additive is polymethylmethacrylate.

5. The composition of claim 2 wherein said additive is polyvinylacetate.

6. The composition of claim 2 wherein said additive is diphenyl phthalate.

7. The composition of claim 1 wherein said additive is a hydrocarbon ether of up to 30 carbon atoms.

8. The composition of claim 1 wherein said additive is a hydrocarbon substituted amine of up to 36 carbon atoms.

9. The composition of claim 1 wherein said additive is a hydrocarbon substituted amide of up to 30 carbon atoms.

10. The composition of claim 1 wherein said additive is a hydrocarbon ketone of up to 35 carbon atoms.

References Cited
UNITED STATES PATENTS 3,316,216   4/1967   Fawcett et al. _____ 260—63

DONALD E. CZAJA, Primary Examiner

M. J. WELSH, Assistant Examiner

U.S. Cl. X.R.

260—45.7, 45.85, 45.9, 874

PO-1050
(5/69)

UNITED STATES PATENT OFFICE
CERTIFICATE OF CORRECTION

Patent No. 3,534,124          Dated October 13, 1970

Inventor(s) Edward George Howard, Jr.

It is certified that error appears in the above-identified patent and that said Letters Patent are hereby corrected as shown below:

Column 1, line 64, "X and X'" should read -- R, R' and R'' --;

Column 2, line 66, insert a comma at the end of the line;

Column 4, line 2, "able" should be -- Table --.

SIGNED AND
SEALED
JAN 19 1971

(SEAL)
Attest:

Edward M. Fletcher, Jr.
Attesting Officer

WILLIAM E. SCHUYLER, JR.
Commissioner of Patents